(12) United States Patent
Maier et al.

(10) Patent No.: US 12,337,865 B2
(45) Date of Patent: Jun. 24, 2025

(54) PREDICTION FOR DRIVING MANEUVERS OF OTHER VEHICLES

(71) Applicant: Robert Bosch GmbH, Stuttgart (DE)

(72) Inventors: Markus Maier, Heimsheim (DE); Stephan Scheiderer, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 348 days.

(21) Appl. No.: 17/941,313

(22) Filed: Sep. 9, 2022

(65) Prior Publication Data

US 2023/0085789 A1 Mar. 23, 2023

(30) Foreign Application Priority Data

Sep. 22, 2021 (DE) ...................... 10 2021 210 545.9

(51) Int. Cl.
| | |
|---|---|
| *B60W 60/00* | (2020.01) |
| *B60W 30/18* | (2012.01) |
| *G06V 10/764* | (2022.01) |
| *G06V 20/58* | (2022.01) |

(52) U.S. Cl.
CPC ..... *B60W 60/001* (2020.02); *B60W 30/18163* (2013.01); *G06V 10/764* (2022.01); *G06V 20/58* (2022.01); *B60W 2554/4041* (2020.02); *B60W 2554/4046* (2020.02)

(58) Field of Classification Search
None
See application file for complete search history.

(56) References Cited

U.S. PATENT DOCUMENTS

| | | | |
|---|---|---|---|
| 11,521,396 | B1 * | 12/2022 | Jain .................... G06F 18/2415 |
| 2017/0369055 | A1 * | 12/2017 | Saigusa ............ G08G 1/096775 |
| 2019/0367019 | A1 * | 12/2019 | Yan ........................ B60W 30/09 |
| 2020/0160151 | A1 * | 5/2020 | Urtasun ................. G06N 20/00 |

(Continued)

FOREIGN PATENT DOCUMENTS

DE 102018222176 A1 6/2020

OTHER PUBLICATIONS

Jinghua Wang, A Bayesian inference based adaptive lane change prediction model, 2021, Elsevier (Year: 2021).*

(Continued)

*Primary Examiner* — Christian Chace
*Assistant Examiner* — Shayne M. Gilbertson
(74) *Attorney, Agent, or Firm* — NORTON ROSE FULBRIGHT US LLP

(57) ABSTRACT

A method of classifying a driving maneuver performed by another vehicle in an environment of an ego-vehicle. In the method: a time series of a metrologically determined position of the other vehicle relative to the ego-vehicle that extends to a time step t is provided; spatial profiles of lanes in which the other vehicle may be located are provided; for a plurality of driving maneuvers from a predetermined catalog of possible driving maneuvers, conditional probabilities for the other vehicle to perform this driving maneuver at the time t are respectively determined with a predetermined model by using the time series of the position and the profiles of the lanes; by using these conditional probabilities, a most likely position and/or a probability distribution of positions of the other vehicle at the time step t is determined.

12 Claims, 2 Drawing Sheets

(56) References Cited

U.S. PATENT DOCUMENTS

2021/0253136 A1\* 8/2021 Yoshihara ....... B60W 30/18154
2021/0339772 A1\* 11/2021 Ramamoorthy ....... G06N 3/045

OTHER PUBLICATIONS

Junxiang Li, A Dynamic Bayesian Network for Vehicle Maneuver Prediction in Highway Driving Scenarios: Framework and Verification, 2019, Electronics (Year: 2019).\*

Tim Wheeler, Probabilistic Driving Models and Lane Change Prediction, 2014 (Year: 2014).\*

\* cited by examiner

PREDICTION FOR DRIVING MANEUVERS OF OTHER VEHICLES

CROSS REFERENCE

The present application claims the benefit under 35 U.S.C. § 119 of German Patent No. 10 2021 210 545.9 filed on Sep. 22, 2021, which is expressly incorporated herein by reference in its entirety.

FIELD

The present invention relates to the prediction for driving maneuvers of other vehicles, which may be utilized by a driver assistance system or a system for at least partially automated driving in an ego-vehicle.

BACKGROUND INFORMATION

Driving a vehicle in traffic is not synonymous with driving the vehicle through a course of static and uniformly moved obstacles. Rather, it is also necessary to respond to the sudden actions of other road users who change their movement state. If another vehicle, for example, changes lanes and thereby enters the safe distance currently maintained to the person ahead, the necessary safe distance to this new person ahead is no longer given and must be actively established again. A lane change by another vehicle that is initiated at the same time as one's own driving maneuver may also result in a collision if none of the parties involved knew about the other's planned maneuver. A total of approximately 18% of all accidents are therefore caused by errors during a lane change.

In addition to human drivers, driver assistance systems, which are to facilitate the driving task, must also take into account lane changes by other vehicles. It is therefore advantageous if such a system can already predict such lane changes before they are actually initiated. A method for predicting lane changes by other vehicles is described in German Patent Application No. DE 10 2018 222 176 A1, for example.

SUMMARY

In the context of the present invention, a method of classifying a driving maneuver performed by another vehicle in an environment of an ego-vehicle is provided. According to an example embodiment of the present invention, the ego-vehicle is a vehicle from which the environment is observed and whose behavior is to be affected based on the result of the classification. The environment in which the other vehicle is located may, for example, be in front of the ego-vehicle in the driving direction. This is not absolutely necessary. For example, it may be useful to analyze the behavior of another vehicle approaching the ego-vehicle from behind or from the side in order to be able to dodge the same with the ego-vehicle, if necessary.

According to an example embodiment of the present invention, as part of the method, a time series of a metrologically determined position of the other vehicle relative to the ego-vehicle that extends to a time step t is provided. The time steps indicate discrete times at which the information about other vehicles in the vicinity of the ego-vehicle as well as the classification of the driving maneuvers of these other vehicles is updated. The time series may be obtained from any upstream system that determines the position with any physical measurement modality. In particular, camera images, video images, ultrasonic images, radar measurements, or lidar measurements may, for example, be used as measurement modalities here.

Furthermore, spatial profiles of lanes in which the other vehicle may be located are provided. These spatial profiles may likewise be determined by any upstream system. This system may merge information from one or more sources into any mapping of locations in the vicinity of the ego-vehicle to lanes. For example, the spatial profiles of the lanes may likewise be available in the form of time series but also as a description valid for a longer period of time. For example, the spatial profiles of lanes may, in particular for example, include a most likely division of the portion of the vicinity of the ego-vehicle that is associated with a roadway into lanes.

Such a division does not necessarily imply pixel-by-pixel semantic segmentation. Rather, the spatial profiles of lanes may also comprise, for example, at least one indication of a geometric shape as well as an indication of a reference point relative to the ego-vehicle. Such a representation is very efficiently compressed and tends to have less noise. For example, a boundary of a lane may be defined as an arc of a particular radius that passes through a particular point and is rotated by a particular angle. The spatial profiles of lanes may point in time into the future beyond the time step t. For example, they may be determined by testing one or more hypotheses about the existence and profile of lanes on the basis of measurement data.

According to an example embodiment of the present invention, for a plurality of driving maneuvers from a predetermined catalog of possible driving maneuvers, conditional probabilities for the other vehicle to perform this driving maneuver at the time t are respectively determined with a predetermined model by using the time series of the position on the one hand and the profiles of the lanes on the other hand. This conditional probability is thus the probability taking into consideration the already known time series of the position and profiles of the lanes. The model may, in particular, be a Bayesian model, for example. For example, Bayesian models are used in email spam filters and determine conditional probabilities that an email is spam, taking into consideration evaluations of emails as "spam" or "not spam" previously entered by the user.

By using the conditional probabilities for the driving maneuvers, a most likely position and/or a probability distribution of positions of the other vehicle at the time t is determined. The same model or a different model may be used for this purpose.

For example, the original position of the other vehicle determined purely metrologically can in particular be corrected with this most likely position or probability distribution such that it is consistent with the conditional probabilities for driving maneuvers determined with the model. The information about the position can thus in particular be denoised.

The respective conditional probabilities for the other vehicle to perform the driving maneuvers from the predetermined catalog at the next time step t+1 are now determined by additionally using the most likely position and/or probability distribution of positions at the time step t determined in this way. The current metrologically determined position at the time step t+1 as well as the spatial profiles of the lanes are thus still used, and the previously determined most likely position and/or probability of positions of the other vehicle is added as a further source of information.

It was found that the additional consideration of the most likely position and/or probability distribution of positions in particular significantly improves the accuracy with which a driving maneuver of the other vehicle can be classified. In particular, the influence of noise and outliers in the measurement data on the determination of the driving maneuver is suppressed. For example, the tendency is thus suppressed that a drift of the measurement data in one direction is confused with a steering maneuver of the other vehicle indicative of a starting lane change. Accordingly, a probability is also increased that a response of the ego-vehicle to the determined conditional probabilities of the traffic situation of the ego-vehicle is appropriate.

In a certain way, an element of self-consistency is thus introduced into the analysis of the metrologically obtained time series and the overall use of the information content contained in this time series is significantly improved.

In a further particularly advantageous example embodiment of the present invention, the most likely position and/or the probability distribution of positions is determined by additionally using recorded behaviors of a plurality of other vehicles. Here, for example, it is possible to use findings of the type that most vehicles stay in their respective lanes during the by far largest part of the trip in terms of time and perform any lane changes substantially uniformly.

In a further advantageous embodiment of the present invention, the model additionally evaluates the model conformity of the behavior of the other vehicle. This model conformity is a measure of how likely, and/or to what degree, the behavior of the other vehicle with respect to the lane it travels is correctly described by the model. In particular, for events that have not been considered in the model used, the model conformity may be lacking. For example, the trajectory of traffic crossing a road does not match the lanes marked on that road at all. Furthermore, another vehicle may also demonstrate non-traffic-appropriate behavior. For example, if an operator indulges in distracting secondary activities or momentarily falls asleep, their vehicle may leave the currently traveled lane for no apparent reason.

In a further particularly advantageous embodiment of the present invention, a driving maneuver to be performed by the ego-vehicle is determined by using at least one conditional probability for the other vehicle to perform a driving maneuver from the predetermined catalog. Such a driving maneuver may then be performed by a downstream driver assistance system, and/or by a downstream system for at least partially automated driving, of the ego-vehicle. As explained above, this allows the behavior of the ego-vehicle to be adapted to the behavior of the other vehicle, like it would also be expected of a human driver of the ego-vehicle.

In particular, in response to detecting that the other vehicle is changing to the lane traveled by the ego-vehicle, for example, a decrease in the speed of the ego-vehicle and/or a change of the ego-vehicle to an adjacent lane can be determined as a driving maneuver to be performed by the ego-vehicle. For example, this may mean that the determined driving maneuver is at least shortlisted for the actual implementation. The maneuver to be ultimately performed may still depend on other factors.

For example, changing the ego-vehicle to an adjacent lane in order to pass the other vehicle is only permitted if there is no restriction on passing. In addition, out of town and on highways, passing must always take place on the left-hand side; free lane choice, and thus right-hand passing, is only permitted within built-up areas. Changing to a new lane should also only ever take place if another, much faster vehicle is not approaching from the rear on this new lane.

Advantageously, the driving maneuver to be performed by the ego-vehicle is determined by additionally using the most likely position and/or the probability distribution of positions of the other vehicle. In this way, it may, for example, be considered how quickly the other vehicle performs a lane change.

In a further advantageous example embodiment of the present invention, the driving maneuver to be performed by the ego-vehicle is determined by additionally using the model conformity. In this way, it may, for example, be recognized that a particular traffic situation has not been considered in the manufacture of a driver assistance system or of a system for at least partially automated driving. Furthermore, it may, for example, be recognized that a driver of another vehicle does not behave in a traffic-appropriate manner and that particular caution is thus necessary.

In particular, in response to the model conformity exceeding a predetermined threshold value, for example, a planning horizon for the driving maneuver to be performed by the ego-vehicle may be shortened; and/or a decrease in the speed of the ego-vehicle and/or an increase in the distance to the other vehicle may be determined as a driving maneuver to be performed by the ego-vehicle.

Especially when another vehicle is not controlled in a traffic-appropriate manner, surprising further actions, which require a quick response, are to be expected. With the shortened planning horizon, the planning of driving maneuvers of the ego-vehicle is updated at shorter intervals. At the same time, a lower speed and a greater distance provide time to respond to surprising actions of the other vehicle.

Systems for at least partially automated driving, and in particular driver assistance systems for a vehicle controlled by a human driver, may, for example, use a model with an extended planning horizon for normal operation in common traffic situations. In unusual situations, a change to a model with a shorter planning horizon may then take place and/or the driving speed may be reduced. For example, as a further escalation level, the system may be deactivated and the driver may be prompted to take control.

This is somewhat analogous to the fact that a human driver also adapts their driving to the complexity of the traffic situation and to the visibility conditions. A much higher driving speed is still safe in simple traffic in good weather on a highway than in a sudden downpour or snowfall, which drastically reduces visibility. Under such adverse conditions, human drivers sometimes also give up trying to continue the journey, and seek protection in the breakdown lane under a bridge.

In a further advantageous embodiment of the present invention, a control signal is determined from a driving maneuver to be performed by the ego-vehicle. The ego-vehicle is controlled with this control signal. The action performed by the ego-vehicle in response to this control is then, with a greater probability, appropriate for the traffic situation represented in the metrologically obtained time series.

The method may in particular be computer-implemented as a whole or in part. The present invention therefore also relates to a computer program including machine-readable instructions which, when executed on one or more computers, cause the computer(s) to perform the described method. In this sense, control devices for vehicles and embedded systems for technical devices that are likewise capable of executing machine-readable instructions are also to be regarded as computers.

Likewise, the present invention also relates to a machine-readable data storage medium and/or to a download product including the computer program. A download product is a digital product that can be transmitted via a data network, i.e., can be downloaded by a user of the data network, and may, for example, be offered for sale in an online shop for immediate download.

Furthermore, a computer may be equipped with the computer program, with the machine-readable storage medium or with the download product.

Further measures improving the present invention are described in more detail below on the basis of the figures, together with the description of the preferred exemplary embodiments of the present invention.

DETAILED DESCRIPTION OF EXAMPLE EMBODIMENTS

Figure 1:
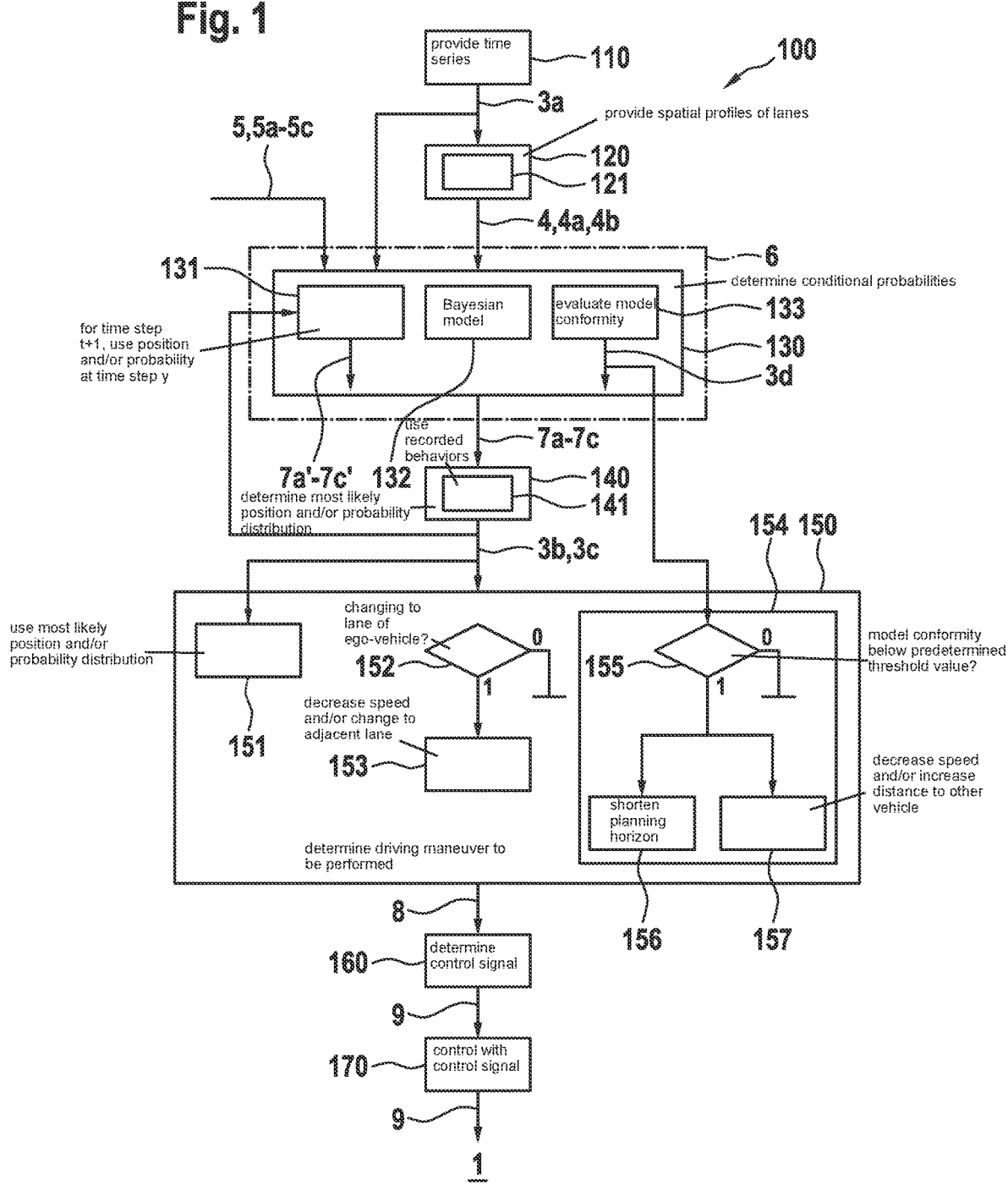
FIG. 1 shows an exemplary embodiment of the method 100 for classifying a driving maneuver, according to the present invention.

FIG. 1 is a schematic flow diagram of an exemplary embodiment of the method 100 for classifying a driving maneuver of another vehicle.

In step 110, a time series 3a of a metrologically determined position of the other vehicle 3 relative to the ego-vehicle 1 that extends to a time step t is provided.

In step 120, spatial profiles 4, 4a, 4b of lanes in which the other vehicle 3 may be located are provided.

According to block 121, the spatial profiles 4, 4a, 4b of the lanes may comprise at least one indication of a geometric shape as well as an indication of a reference point relative to the ego-vehicle 1. As explained above, the lanes are thereby fully described in a highly compressed form without being bound to the resolution of a pixel grid.

In step 130, for a plurality of driving maneuvers 5a-5c from a predetermined catalog 5 of possible driving maneuvers, conditional probabilities 7a-7c for the other vehicle 3 to perform this driving maneuver 5a-5c at the time t are respectively determined with a predetermined model 6 by using the time series 3a of the position on the one hand and the profiles 4, 4a, 4b of the lanes on the other hand. According to block 132, the model 6 may, in particular, be a Bayesian model, for example.

For example, from the time series 3a of the position, the conditional probability may in particular for example derive indications as to why the possible driving maneuvers 5a-5c should not occur in a uniformly distributed manner. For example, if the other vehicle 3 has already repeatedly moved from the center of its lane to the left edge of its lane, it is particularly likely that it will soon make a lane change to the left. On the other hand, it is less likely that the other vehicle 3 will stay in its current lane and even significantly less likely that it will make a lane change to the right.

By using these conditional probabilities 7a-7c, a most likely position 3b and/or a probability distribution 3c of positions of the other vehicle 3 at the time step t is determined (block 140). According to block 141, this may, for example, in particular take place by additionally using recorded behaviors of a plurality of other vehicles.

According to block 131, in the next iteration for the time step t+1, the respective conditional probabilities 7a'-7c' for the other vehicle 3 at the time step t+1 to perform the driving maneuvers 5a-5c from the predetermined catalog 5 are then determined by additionally using the thus determined most likely position 3b and/or probability distribution 3c of positions at the time step t.

Furthermore, according to block 133, the model conformity 3d of the behavior of the other vehicle 3 may additionally be evaluated with the model 6. As explained above, both behavior that was not considered in the model (such as crossing the roadway in a model that only analyzes lane keeping and lane changes) and non-traffic-appropriate behavior (such as erratic non-adherence to the lane) are thereby identified.

In step 150, a driving maneuver 8 to be performed by the ego-vehicle 1 is determined by using at least one conditional probability 7a-7c for the other vehicle 3 to perform a driving maneuver 5a-5c from the predetermined catalog 5.

According to block 151, the driving maneuver 8 to be performed by the ego-vehicle 1 can be determined by additionally using the most likely position 3b and/or the probability distribution 3c of positions of the other vehicle 3.

According to block 152, it can be checked whether the other vehicle 3 is changing to the lane traveled by the ego-vehicle 1. If this is the case (logical value 1), according to block 153,
  a decrease in the speed of the ego-vehicle 1 and/or
  a change of the ego-vehicle 1 to an adjacent lane can be determined as a driving maneuver to be performed by the ego-vehicle 1.

According to block 154, the driving maneuver 8 to be performed by the ego-vehicle 1 can be determined by additionally using the model conformity 3d.

For example, this may in particular include checking according to block 155 as to whether the model conformity 3d is falling below a predetermined threshold value. If this is the case (logical value 1),
  according to block 156, a planning horizon for the driving maneuver 8 to be performed by the ego-vehicle 1 may be shortened; and/or
  according to block 157, a decrease in the speed of the ego-vehicle 1 and/or an increase in the distance to the other vehicle 3 may be determined as a driving maneuver 8 to be performed by the ego-vehicle 1.

In step 160, a control signal 9 is determined from a driving maneuver 8 to be performed by the ego-vehicle 1.

In step 170, the ego-vehicle 1 is controlled with this control signal 9.

Figure 2:
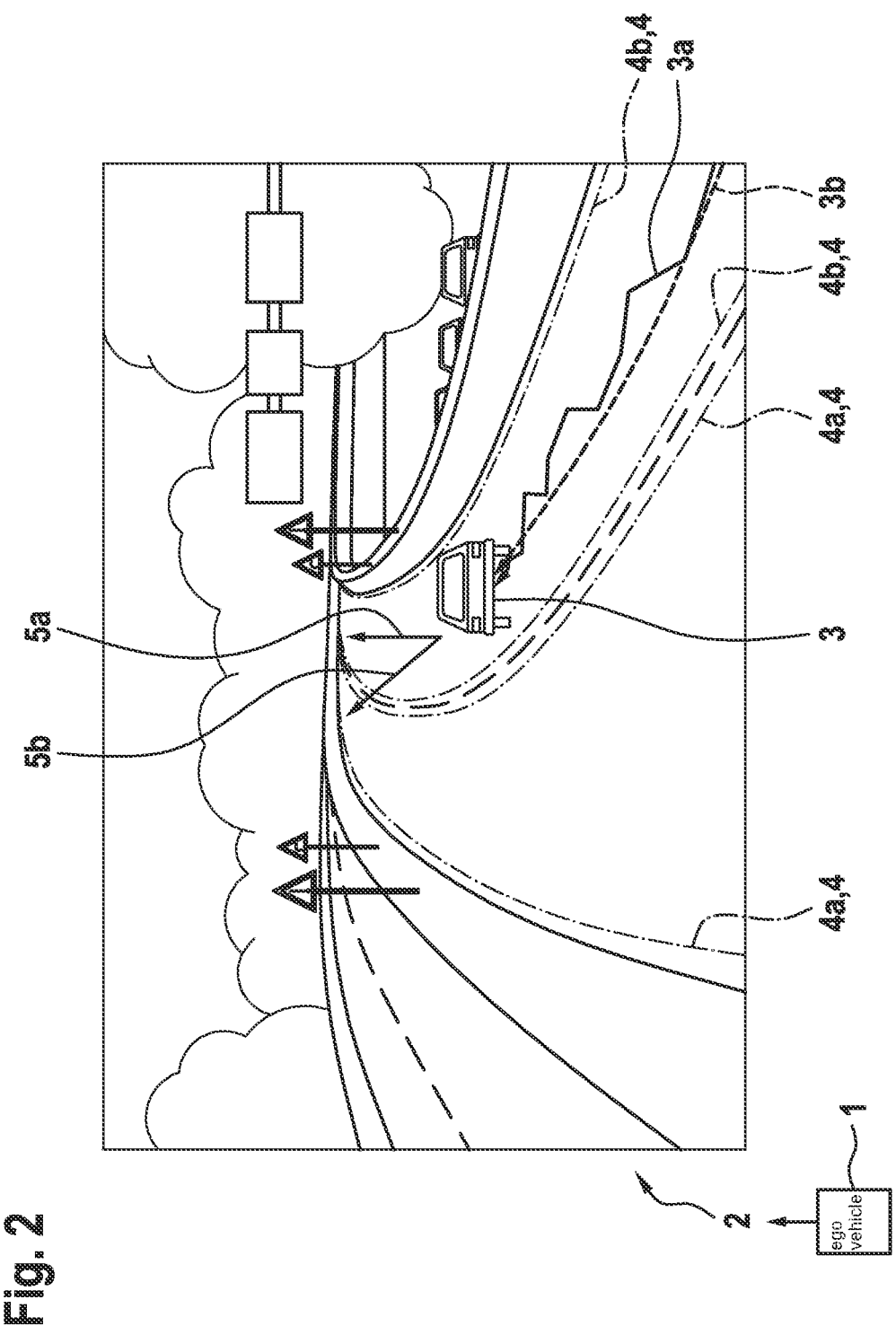
FIG. 2 shows an exemplary application situation of the method 100, according to the present invention.

FIG. 2 shows an exemplary application situation for the method 100.

The ego-vehicle 1 observes the vicinity 2 in front of it and, in the process, records the traffic situation shown in FIG. 2. In this situation, the ego-vehicle 1 is traveling on the left one of two lanes of a multi-lane roadway. Spatial profiles 4a and 4b are provided for the two lanes.

In the situation shown in FIG. 2, another vehicle 3 is traveling in the right lane. A time series 3a for its position has been obtained metrologically. With the method 100 described above, it can now be predicted whether the other vehicle 3 will stay in the right lane (driving maneuver 5a) or will change to the left lane (driving maneuver 5b). The respectively most likely position 3b of the other vehicle 3 for each time step can then be determined therefrom. The profile of this most likely position 3b is substantially free of the measurement inaccuracies which are inherent in the metrologically determined time series 3a of the position.

What is claimed is:

1. A method of operation of an ego-vehicle, the method comprising:
   classifying a driving maneuver performed by another vehicle in an environment of the ego-vehicle, the classifying being performed by performing the following steps:
   providing a time series of a metrologically determined position of the other vehicle relative to the ego-vehicle that extends to a time step t;
   providing spatial profiles of lanes in which the other vehicle may be located;
   for each driving maneuver of a plurality of predefined driving maneuvers, respectively determining conditional probabilities for the other vehicle to perform the respective driving maneuver at the time t, with a predetermined model by using the time series of the position and the profiles of the lanes;
   determining, by using the conditional probabilities, a most likely position and/or a probability distribution of positions of the other vehicle at the time step t; and
   for each driving maneuver of the plurality of predefined driving maneuvers, determining respective conditional probabilities for the other vehicle to perform the respective driving maneuver at a next time step t+1, by additionally using the determined most likely position and/or probability distribution of positions at the time step t;
   determining a driving maneuver to be performed by the ego-vehicle based on at least one of the determined conditional probabilities for the other vehicle; and
   controlling the ego-vehicle with a control signal to perform the determined driving maneuver.

2. The method as recited in claim 1, wherein the spatial profiles of the lanes include at least one indication of a geometric shape and an indication of a reference point relative to the ego-vehicle.

3. The method as recited in claim 1, wherein the plurality of predefined driving maneuvers includes at least staying in a currently traveled lane and changing from the currently traveled lane to an adjacent lane.

4. The method as recited in claim 1, wherein the most likely position and/or the probability distribution of positions is determined by additionally using recorded behaviors of a plurality of other vehicles.

5. The method as recited in claim 1, wherein the predetermined model is a Bayesian model.

6. The method as recited in claim 1, further comprising:
   evaluating, with the predetermined model, a model conformity of a behavior of the other vehicle.

7. The method as recited in claim 1, wherein the determination of the driving maneuver to be performed by the ego-vehicle is additionally made using the most likely position and/or the probability distribution of positions of the other vehicle.

8. The method as recited in claim 1, wherein, in response to detecting that the other vehicle is changing to a lane traveled by the ego-vehicle, a decrease in the speed of the ego-vehicle and/or a change of the ego-vehicle to an adjacent lane is determined, as the driving maneuver to be performed by the ego-vehicle.

9. The method as recited in claim 1, further comprising:
   evaluating, with the predetermined model, a model conformity of a behavior of the other vehicle;
   wherein the determination of the driving maneuver to be performed by the ego-vehicle is additionally made using the model conformity.

10. The method as recited in claim 9, wherein, in response to the model conformity falling below a predetermined threshold value:
    (i) a planning horizon for the driving maneuver to be performed by the ego-vehicle is shortened; and/or
    (ii) a decrease in a speed of the ego-vehicle and/or an increase in a distance to the other vehicle is determined as the driving maneuver to be performed by the ego-vehicle.

11. A non-transitory machine-readable storage medium on which is stored a computer program that is executable by a computer system having one or more computers and that, when executed by the computer system, causes the computer system to perform a method of operation of an ego-vehicle, the method comprising:
    classifying a driving maneuver performed by another vehicle in an environment of the ego-vehicle, the classifying being performed by performing the following steps:
    providing a time series of a metrologically determined position of the other vehicle relative to the ego-vehicle that extends to a time step t;
    providing spatial profiles of lanes in which the other vehicle may be located;
    for each driving maneuver of a plurality of predefined driving maneuvers, respectively determining conditional probabilities for the other vehicle to perform the respective driving maneuver at the time t, with a predetermined model by using the time series of the position and the profiles of the lanes;
    determining, by using the conditional probabilities, a most likely position and/or a probability distribution of positions of the other vehicle at the time step t; and
    for each driving maneuver of the plurality of predefined driving maneuvers, determining respective conditional probabilities for the other vehicle to perform the respective driving maneuver at a next time step t+1, by additionally using the determined most likely position and/or probability distribution of positions at the time step t;
    determining a driving maneuver to be performed by the ego-vehicle based on at least one of the determined conditional probabilities for the other vehicle; and
    controlling the ego-vehicle with a control signal to perform the determined driving maneuver.

12. A computer system comprising one or more computers configured to perform a method of operation of an ego-vehicle, the method comprising:
    classifying a driving maneuver performed by another vehicle in an environment of the ego-vehicle, the classifying being performed by:
    providing a time series of a metrologically determined position of the other vehicle relative to the ego-vehicle that extends to a time step t;
    providing spatial profiles of lanes in which the other vehicle may be located;
    for each driving maneuver of a plurality of predefined driving maneuvers, respectively determining conditional probabilities for the other vehicle to perform the respective driving maneuver at the time t, with a predetermined model by using the time series of the position and the profiles of the lanes;
    determining, by using the conditional probabilities, a most likely position and/or a probability distribution of positions of the other vehicle at the time step t; and
    for each driving maneuver of the plurality of predefined driving maneuvers, determining respective conditional probabilities for the other vehicle to perform the respective driving maneuver at a next time step t+1, by additionally using the determined most likely position and/or probability distribution of positions at the time step t;

determining a driving maneuver to be performed by the ego-vehicle based on at least one of the determined conditional probabilities for the other vehicle; and controlling the ego-vehicle with a control signal to perform the determined driving maneuver.

* * * * *